United States Patent
Yamaoka et al.

(10) Patent No.: US 10,753,364 B2
(45) Date of Patent: Aug. 25, 2020

(54) WEARABLE BLOWER AND ASSEMBLY

(71) Applicant: CHERVON (HK) LIMITED, Wanchai (HK)

(72) Inventors: Toshinari Yamaoka, Nanjing (CN);
Xiandian Shao, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 115 days.

(21) Appl. No.: 15/629,934

(22) Filed: Jun. 22, 2017

(65) Prior Publication Data

US 2018/0000014 A1 Jan. 4, 2018

(30) Foreign Application Priority Data

Jun. 30, 2016 (CN) .......................... 2016 1 0506894
Jun. 30, 2016 (CN) .......................... 2016 1 0508700
Jun. 30, 2016 (CN) .......................... 2016 1 0510524

(51) Int. Cl.
*F04D 19/00* (2006.01)
*E01H 1/08* (2006.01)
(Continued)

(52) U.S. Cl.
CPC ........... *F04D 19/002* (2013.01); *A01G 20/47* (2018.02); *A47L 5/14* (2013.01); *E01H 1/0809* (2013.01);
(Continued)

(58) Field of Classification Search
CPC ........ A01G 20/00; A01G 20/43; A01G 20/47; E01H 1/0809; F04D 19/002;
(Continued)

(56) References Cited

U.S. PATENT DOCUMENTS 5,313,735 A * 5/1994 Latouche ............... A01K 87/08
  43/25
8,708,519 B2  4/2014 Kovacik et al.
(Continued)

FOREIGN PATENT DOCUMENTS

| CN | 203270492 U | 11/2013 |
| CN | 205223949 U | 5/2016 |
| WO | 2015161884 A1 | 10/2015 |

OTHER PUBLICATIONS

CIPO, Office Action issued on Canadian patent application No. 2,972,042, dated Jun. 19, 2018, 4 pages.

*Primary Examiner* — Orlando E Aviles
*Assistant Examiner* — Aaron R McConnell
(74) *Attorney, Agent, or Firm* — Greenberg Traurig, LLP

(57) ABSTRACT

An assembly including a wearable blower having a fan, a motor, an air duct having a duct housing thereof, a handle attached to the duct housing, and a hanger disposed on the duct housing. The hanger has an attachment part attached to the duct housing and adjacent to the handle and a hanger part connected to the attachment part for holding an accessory attached to the blower. The hanger part rotates with respect to the duct housing at a first hanging position whereat the hanger part is unfolded with an opening mouth for holding the accessory of the blower and the hanger part rotates with respect to the duct housing at a second folded position. Thus, the arrangement of the hanger can help the user to hold the accessory of the blower at the work states.

12 Claims, 22 Drawing Sheets

(51) Int. Cl.
 *A01G 20/47* (2018.01)
 *A47L 5/14* (2006.01)
 *F04D 25/08* (2006.01)
 *F04D 29/52* (2006.01)
 *F04D 29/64* (2006.01)
 *F04D 29/54* (2006.01)

(52) U.S. Cl.
 CPC ........... *F04D 25/08* (2013.01); *F04D 29/522* (2013.01); *F04D 29/545* (2013.01); *F04D 29/644* (2013.01)

(58) Field of Classification Search
 CPC .... F04D 25/084; F04D 29/403; F04D 29/603; F04D 29/622; F04D 29/642; F04D 29/547; A47L 9/322; A47L 5/14
 USPC .......................................................... 15/405
 See application file for complete search history.

(56) References Cited

U.S. PATENT DOCUMENTS

2011/0292651 A1\* 12/2011 Kovacik ............... F21L 14/023
 362/235
2017/0042096 A1\* 2/2017 Bylund .................... A47L 5/14

\* cited by examiner

US 10,753,364 B2

WEARABLE BLOWER AND ASSEMBLY

RELATED APPLICATION INFORMATION

This application claims the benefits of Chinese Patent Application No. CN 201610506894.0 filed on Jun. 30, 2016, Chinese Patent Application No. CN 201610510524.4, filed on Jun. 30, 2016, and Chinese Patent Application No. 201610508700.0, filed on Jun. 30, 2016, the disclosures of which are incorporated herein by reference in their entirety.

FIELD OF THE DISCLOSURE

The present disclosure relates generally to a wearable blower and/or an assembly including the wearable blower thereof.

BACKGROUND OF THE DISCLOSURE

A blower is a type of gardening tools that is mainly used for blowing grass, chips, leaves, etc. to clean an area. Some of the blowers include an eyelet for hanging or holding an accessory, such as a strap arrangement, to the blower. The eyelet generally secures to the blower and may interfere with the use of the blower during the operation thereof when the user does not need to hang the accessory of the blower by the eyelet.

The statements in this section merely provide background information related to the present disclosure and may not constitute prior art.

SUMMARY

In one aspect of the disclosure, a wearable blower comprises a fan, a drive unit configured to drive the fan, an air duct having a duct housing for accommodating at least one of the fan and the drive unit therein, a handle attached to the duct housing, a hanger disposed on the duct housing, the hanger having an attachment part rotatably attached to the duct housing and adjacent to the handle, and a hanger part connected to the attachment part for holding an accessory attached to the blower, wherein the hanger part rotates with respect to the duct housing at a first hanging position whereat the hanger part is unfolded with an opening mouth configured for holding the accessory attached to the blower, and the hanger part rotates with respect to the duct housing at a second folded position whereat the hanger part is folded.

In another aspect of the disclosure, an assembly comprises a hand-guided work apparatus, a holder attached to the hand-guided work apparatus and configured to be worn by an operator, the hand-guided work apparatus comprising a fan, a drive unit configured to drive the fan, an air duct having a duct housing for accommodating at least one of the fan and the drive unit therein, a handle attached to the duct housing, a hanger disposed on the duct housing, the hanger having an attachment part rotatably attached to the duct housing and adjacent to the handle, and a hanger part connected to the attachment part for holding an accessory attached to the hand-guided work apparatus, wherein the hanger part is configured to rotate between a first hanging position and a second folded position about a rotation axis, which tilts relative to a central axis of the hand-guided work apparatus.

In another aspect of the disclosure, a wearable blower comprises a fan, a drive unit configured to drive the fan, an air duct having a duct housing for accommodating at least one of the fan and the drive unit therein, a handle attached to the duct housing, a hanger disposed onto the duct housing, the hanger having an attachment part movably attached to the duct housing and adjacent to the handle, and a hanger part connected to the attachment part for holding an accessory attached to the blower, wherein the hanger part rotates with respect to the duct housing between a plurality of work positions at least including a first work position and a second work position, wherein the work positions of the hanger part vary in accordance with the user's different operating states.

Further areas of applicability will become apparent from the description provided herein. It should be understood that the description and specific examples are intended for purposes of illustration only and are not intended to limit the scope of the present disclosure.

DETAILED DESCRIPTION

The following description of the preferred embodiments is merely exemplary in nature and is in no way intended to limit the scope of the invention hereinafter claimed, its application, or uses.

Figure 1:
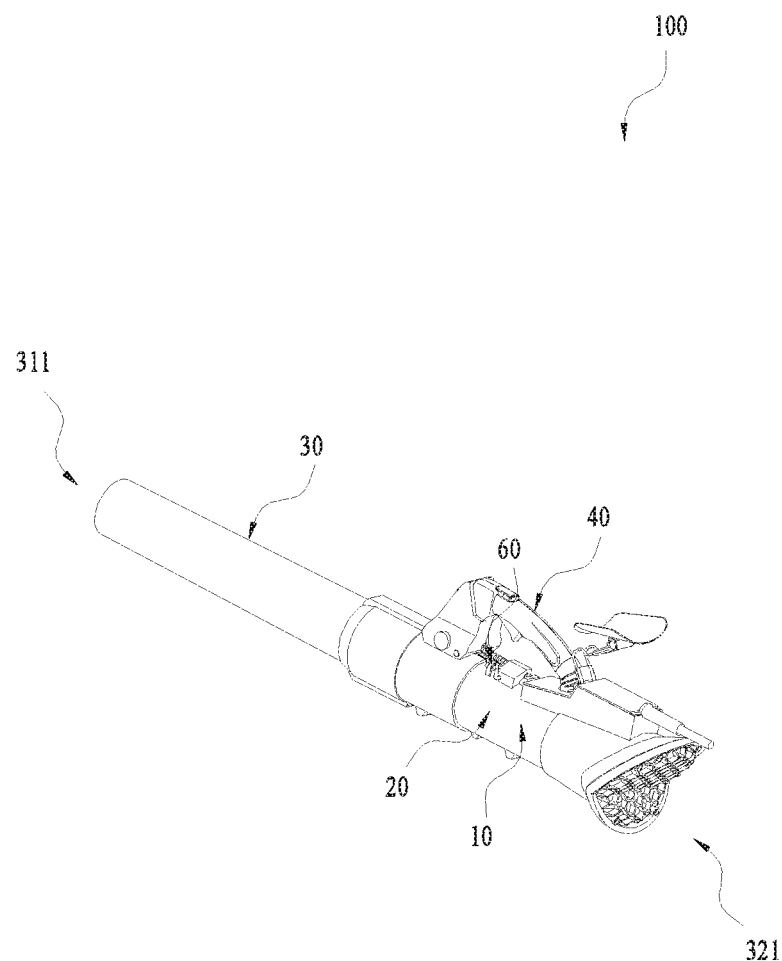
FIG. 1 is an exemplary embodiment of a blower.
Figure 2:
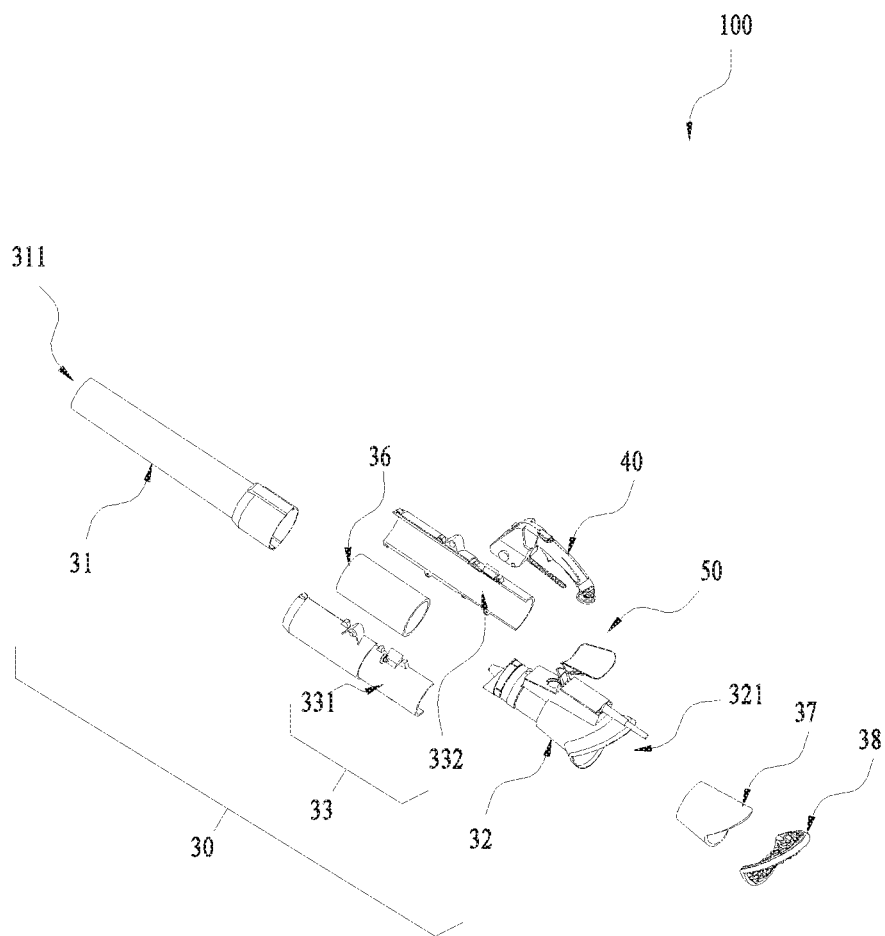
FIG. 2 is an exploded view of the blower of FIG. 1.
Figure 3:
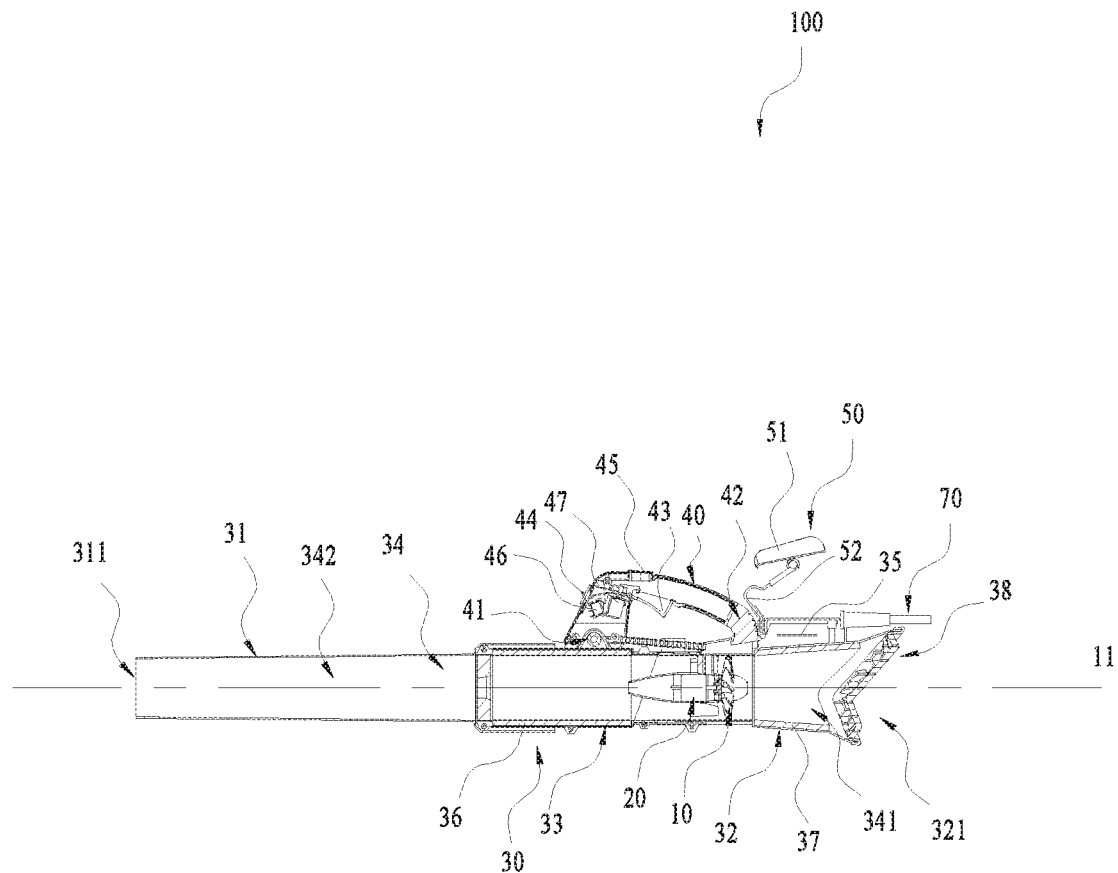
FIG. 3 is a cross-sectional view of the blower of FIG. 1.

FIG. 1 to FIG. 3 depicts an example of a wearable blower. The blower 100 includes a fan 10, a drive unit or a motor 20, an air duct assembly 30 and a handle 40.

The air duct assembly 30 is used to generate airflow. In this example, the fan 10 is an axial fan 10. The fan 10 is attached to the drive unit or a motor 20 which drives the fan 10 to rotate about a central line or axis 11 with respect to the blower. The drive unit 20 may be an AC motor or a DC motor or a combination of one or more AC motors and/or one or more DC motors. More specifically, the drive unit or motor 20 is a brushless motor. The air duct assembly 30 includes at least one duct housing with an air passage 34. The air passage 34 is provided with an air inlet 311 and an air outlet 312. The handle 40 is operated by a user and attached to the duct housing, and the blower 100 may be referred to as a hand-held device. The fan 10 is disposed within the air passage 34 of the duct assembly 30. In other words, the air passage 34 of the duct assembly 30 accommodates the fan 10. In an example, the fan is coupled to the drive unit or the motor 20, the motor 20 is also included within the air passage 34 of the duct assembly 30. Further, the motor 20 is located between the fan 10 and the outlet 311.

The fan 10 rotates by the motor so as to drive the air flow from the air inlet 321 to the air outlet 311 through the air passage 34. As shown in the illustrated example of FIG. 2 and FIG. 3, the duct assembly 30 includes an inlet duct 32, an outlet duct 31, and a connecting duct 33 connected therebetween. The outlet duct 31 is formed with the air outlet 311, and the inlet duct 32 is formed with the air inlet 321. The connecting duct 33 is a configuration of two parts including a first connecting duct part 331 and a second connecting duct part 332. The air passage 34 is a substantially linear passage which extends along a central axis 11 of the blowers with the air inlet 321, the fan 10 and the air outlet 311 arranged in a straight line. The outlet duct 31 is detachably connected to the connecting duct 33 so that the user can disassemble the outlet duct 31 from the blower 100 when not used in order to reduce the area occupied by the blower 100.

Figure 4:
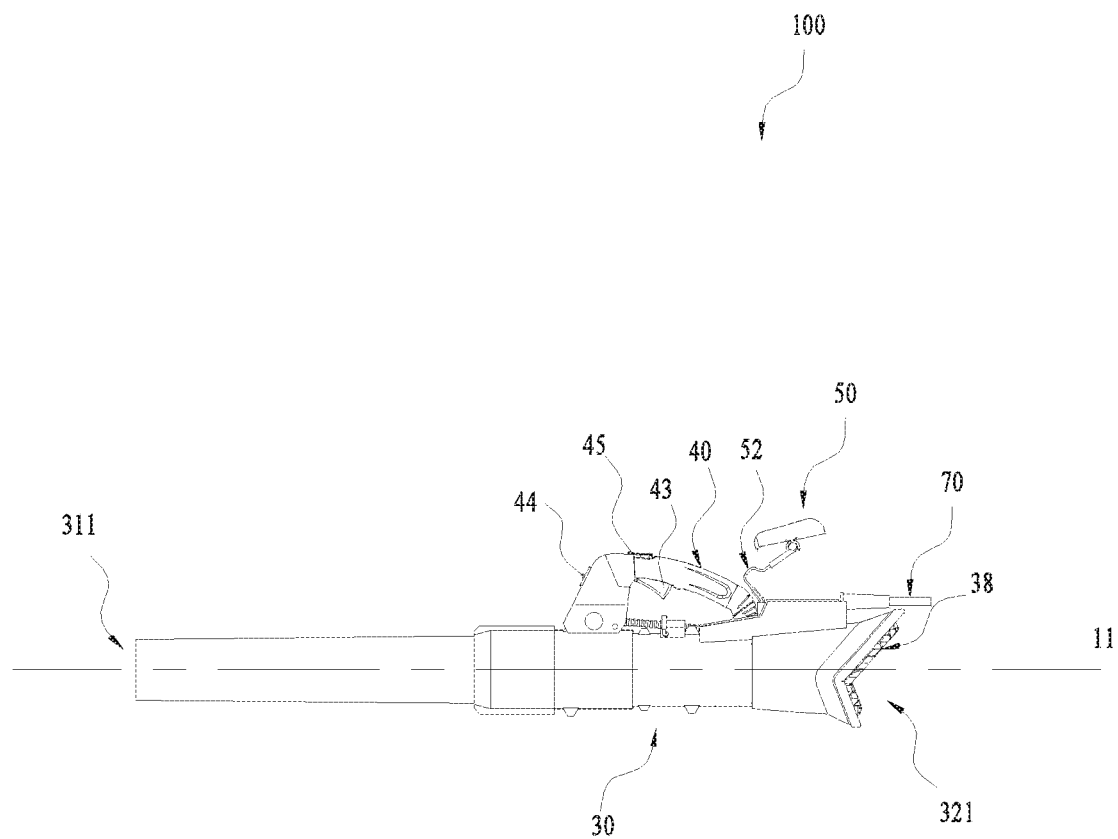
FIG. 4 is a front view of the blower of FIG. 1.

In FIG. 3 and FIG. 4, the handle 40 is located between the air inlet 321 and the air outlet 311 along the central axis of the blower, and disposed at a location proximate to a center of gravity of the blower during the operation thereof for the user to grip or hold the handle 40 to more comfortably. The motor 20 is located between two opposite ends of the handle 40 which attaches to the duct 30, and has its weight force which also acts on the duct 30 between the two handle ends. In this example, the blower includes a first buffer 41 and a second buffer 42, and the handle 40 has the two ends respectively attached to the duct housing 30 by the first buffer 41 and the second buffer 42. The first buffer 41 or the second buffer 42 has some elasticity, and is made of materials which may include a rubber material. The first buffer 41 and the second buffer 42 are located at two opposite ends of the motor or the handle 40.

The blower 100 includes a trigger 43 for allowing the user to control the blower 100 by the trigger 43. Specifically, the trigger 43 controls a start switch 47 which electrically couples to the motor 20, so that the control of the motor 20 is achieved by operating or pushing the trigger 43. In this embodiment, the user operates the trigger 43 not only to control the starting and stopping of the motor 20 but also to control the rotational speed of the motor 20. The start switch 47 is disposed within a handle housing of the handle 40. In addition, the blower 100 also includes a lock switch 44 which prevents the blower 100 from being erroneously activated. Specifically, the lock switch 44 is used to lock the trigger 43, and the trigger 43 cannot be triggered when the lock switch 44 is turned on or at the locked state.

Further, the blower 100 includes an amplifier button 45 which enables the blower 100 to operate at a maximum power, so that heavier things, such as debris, can be blown away. The user can release the amplifier button 45 so that the motor 20 is operated at a predetermined speed determined by the trigger 43 when the blower is not required to operate at a higher power. The amplifier button 45 controls the amplification switch 46, which electrically connects to the motor 20 and the amplification switch 46 is triggered by the outer amplifier button 45 so that the blower 100 can operate at maximum power. The amplification switch 46 is disposed within the handle housing of the handle 40. The user holds the handle 40 by one hand, and can operate the amplifier button 45 and the trigger 43 by using one hand at the same time when the handle 40 is held by the user.

The air duct 30 is formed with at least one chamber for accommodating a PCB board or circuit board 35, or the circuit board 35 is located within the chamber. In the direction of the central axis 11 of the blower, the circuit board 35 is located between the air inlet 321 and the air outlet 311. Specifically, the circuit board 35 is located between the motor 20 and the air inlet 321 or behind the handle 40, while the motor 20 is located between the air outlet 311 and the circuit board 35.

In FIG. 2 and FIG. 3, the handle is attached to the duct housing and disposed at a location between the inlet and the outlet along the central axis direction of the blower. The hand-guided blower or work apparatus comprises an arm support 50 for supporting the operator's arm except for the handle 40. That is, the blower includes an arm holder or support 50 which, when the user holds the handle 40, supports the user's arm between the handle 40 and the air inlet 321. Thus, the user can operate the blower with one hand for a long time without fatigue. The arm support 50 has a support surface 51, which is more adjacent to the inlet 321 than the outlet 311 along the central axis direction and set to be in contact with an arm of the operator when the handle 40 is held by the operator. Further, the arm support 50 is located behind the handle 40 and more adjacent to the inlet 321 or between the handle 40 and the inlet 321. In FIG. 3, the PCB board 35 is located between the support surface 51 and the air duct 34.

Figure 5:
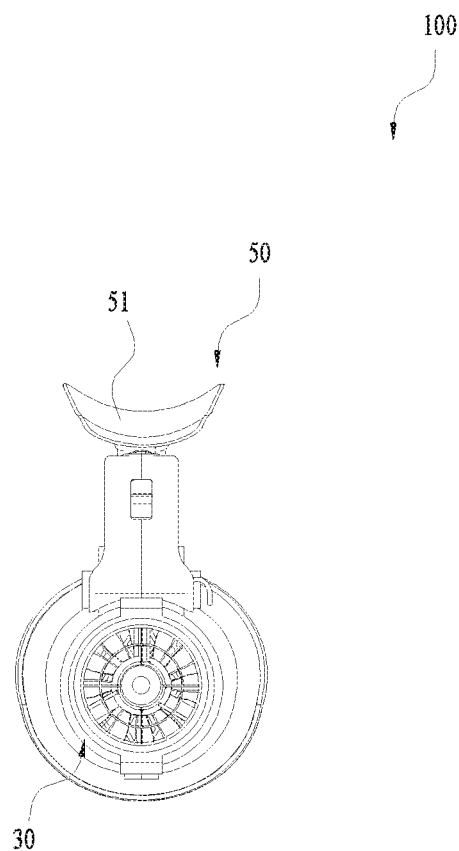
FIG. 5 is a left side view of the blower of FIG. 1.
Figure 6:
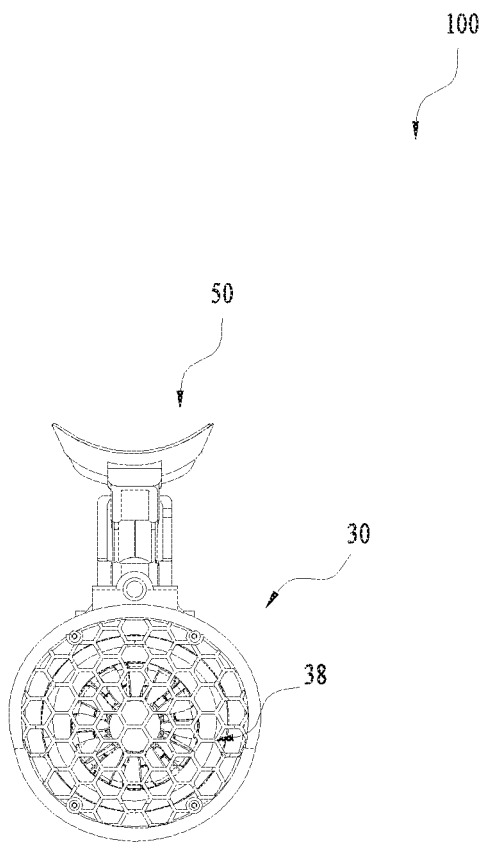
FIG. 6 is a right side view of the blower of FIG. 1.
Figure 7:
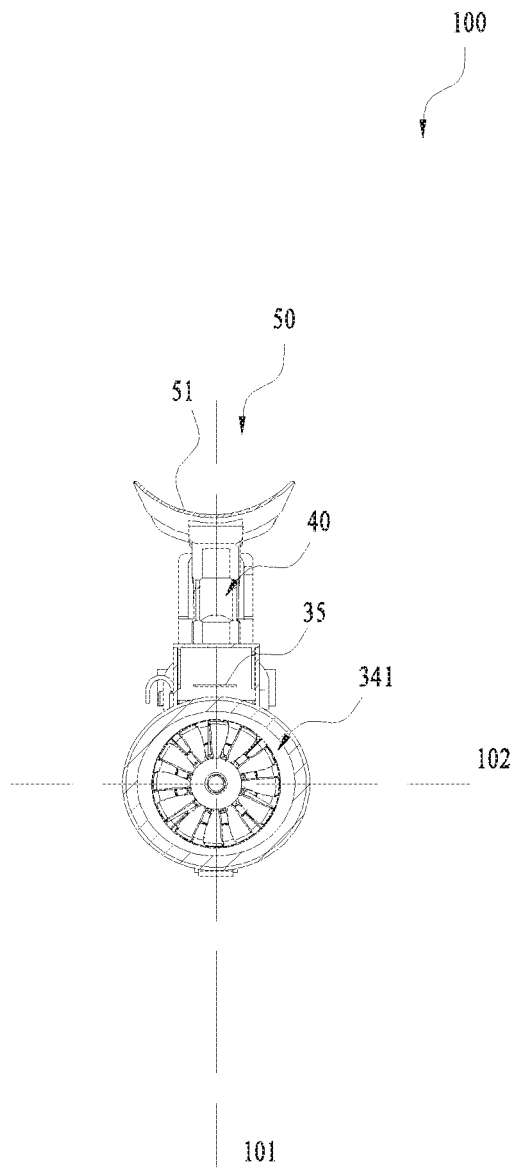
FIG. 7 is another cross-sectional view of the blower of FIG. 1.

In FIG. 5 to FIG. 7, the support surface 51 is of a curved shape suitable to be in contact with the user's arm, and has a middle part with opposite support side-edges, which are bent more away from the blower than the middle part of the support surface 51. In FIG. 4, the support surface 51 of the arm support 50 has a front support end and a rear support end, the front support end near the outlet 311 is located more adjacent to a central axis of the blower than the rear support end near the inlet 321. Thus, the operator can use the arm support more comfortably because of the tilted arm support during the operation thereof. The trigger or button 43, 44, 45 for at least controlling the operation of the drive unit 20 is located at a position between the central axis line of the blower and the support surface 51 of the arm support 50.

In FIG. 4, the blower includes a support attachment 52 for attaching the arm support 50 to the duct housing. The support attachment 52 has elasticity to allow the movement of the arm support 50 relative to the duct housing.

The arm support 50 has an upper portion, made of soft material, near the side of the arm, to provide a cushion for the arm support 50, which may be of hard material. The arm support 50 can entirely use the soft material, or at least partly use the soft material. Specifically, the arm support 50 can be made of material layers including a soft material layer and a hard material layer, or combination of soft material and hard material layers. The soft material layer or layers of the arm support 50 can be employed to be in contact with the user's arm for comfortable consideration.

In a preferred embodiment, the blower includes a support attachment 52 for attaching the arm support 50 to the duct housing 30. The support attachment 52 has elasticity to allow movement of the arm support 50 relative to the duct housing 30. The arm support 50 is movably and removably attached to the air duct 30 by the support attachment 52.

As shown in FIG. 3 and FIG. 4, the blower 100 includes a cable 70 that leads from the motor 20 or the circuit board 35 to an outer power supply. The cable 70 of the power supply is attached to the duct housing 30 by a cable attachment. The circuit board 35 is located between the handle and the cable attachment which is attached to the duct housing. The circuit board 35 and the handle 40 are located at the same side of the blower with the cable attachment of the cable 70. That is, the circuit board 35 is located behind the handle 40, or in front of the cable attachment to the cable 70. The handle 40 is located between the air outlet 311 and the cable attachment of the blower 30, and the cable 70 is disposed adjacent to the rear end of the blower 100.

In FIG. 2 and FIG. 3, the blower 100 also includes a noise reduction assembly for reducing the noise of the blower 100 during the operation thereof, and the noise reduction members are provided in the air passage 34, and may be removably attached to the inner wall of the air duct 30 forming the air passage 34. The noise reduction assembly includes a first noise reduction member 36 and a second noise reduction member 37 respectively provided on front and rear ends of the fan 10 along the direction of the air flow. The first noise reduction member 36 is provided on the upstream of the duct passage 34, while the second noise reduction member 37 is provided on the downstream of the duct passage 34. In detail, the first noise reduction member 36 is at least partly provided between the fan 10 and the air outlet 311, while the second noise reduction member 37 is at least partly provided between the fan 10 and the air inlet 321.

The air duct 30 defines an inlet passage 341 for the inlet air and an outlet passage 342 for the outlet air. The inlet passage 341 is formed by an inlet duct 32, and the air inlet duct 32 has one end acts as an air inlet 321. More specifically, the inlet air passage 341 is configured to extend along the central axis of the blower, and gradually shrink from the air inlet 321 to the air outlet 311 along the flow direction of the air flow. That is, upper and down sides of the passage 341 is set to gradually shrink towards the central axis of the blower. The second noise reduction member 37 is disposed within the inlet passage 341 and removably attached to the inner wall of the inlet duct 32.

The air outlet duct 31 and the connecting duct 33 forms the outlet passage 342. The first noise reduction member 36 is disposed within the outlet passage 342 and removably attached to the inner wall of the connecting duct 33. In another embodiment, the first noise reduction member 36 may be disposed onto the inner wall of the outlet duct 31. The outlet passage 342 and the inlet passage 341 combine to form the whole passage 34.

The blower 100 also includes an isolation cover 38 which covers the air inlet 321 and prevents matter from entering the duct passage 34. The isolation cover 38 is mounted to the blower 30, and further can be removably attached to the inlet duct 32.

As shown in FIG. 3 and FIG. 7, in a cross-section plane perpendicular to the central axis 11 of the blower, the inlet passage 341 is substantially of an elliptical shape with a left-right dimension of the inlet passage 341 along the left-right direction of the inlet passage 341 being greater than an up-down dimension of the inlet passage 341 along the up-down direction of the inlet passage 341. The handle 40 is symmetrical with respect to a plane, and a maximum normal size of the inlet passage 341 along a normal direction vertical to the plane of the handle 40 is greater than a maximum plane size of the inlet passage 341 along a direction of the plane of the handle 40.

Figure 8:
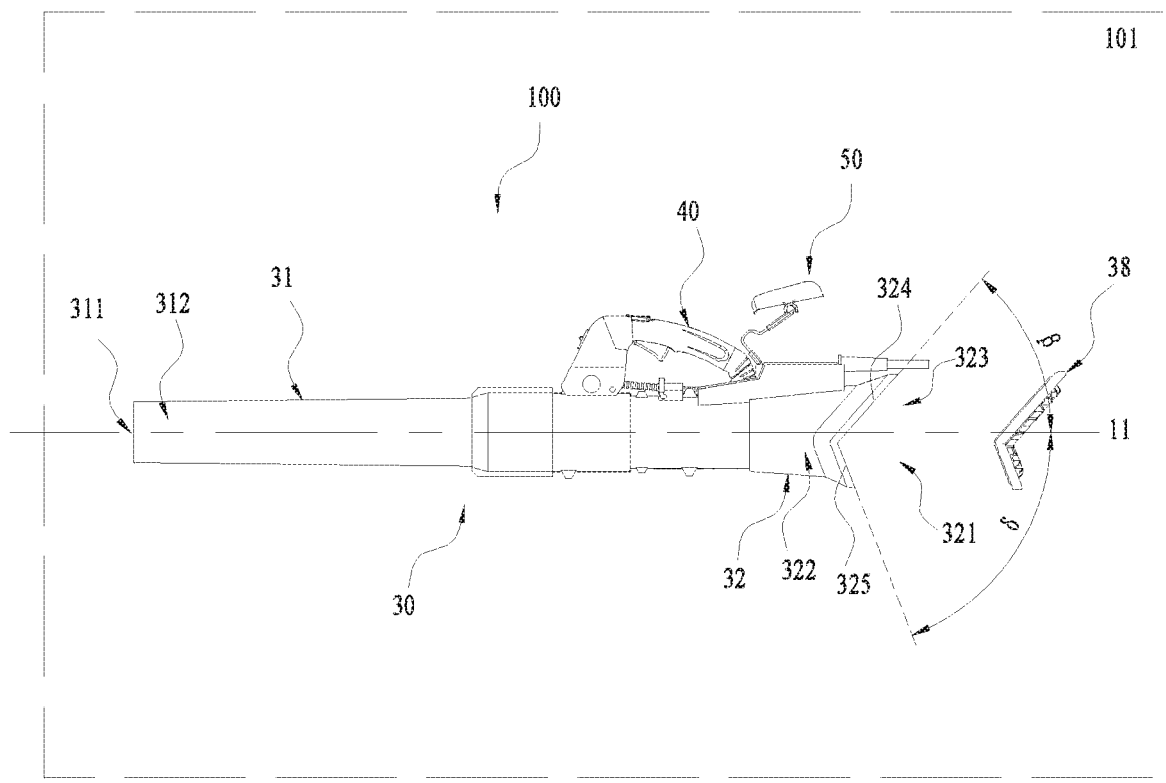
FIG. 8 is a schematic view showing an example of a first projection line in a first projection plane of the blower of FIG. 1.

As shown in FIG. 8, the air duct 30 includes an inlet portion or section 322, and an outlet portion or section 312. The inlet portion or section 322 is formed with the air inlet 321, and the outlet portion 312 is formed with the air outlet 311. Specially, the inlet portion 322 is a part of the inlet duct 32, and an outlet portion 312 is a part of the outlet duct 31.

The inlet section 322 of the air duct assembly 30 comprises a first inlet part 324 and a second inlet part 325 that intersects with each other, wherein the first inlet part 324 is configured to face downwardly and tilt relative to the central axis of the blower with a first tilting angle $\beta$, and the second inlet part 325 is configured to face upwardly and title relative to the central axis of the blower with a second tilting angle $\delta$ which is greater than the first tilting angle $\beta$, the first inlet part 324 having a cover area greater than that of the second inlet part 325. It should be noted that a sum of the first tilting angle and the second tilting angle is greater than 90 degrees, which is set to increase the amount of air into the blower from the outer.

Due to the inlet section 322 for the inlet 321 having two parts including the first inlet part 324 and the second inlet part 325, problems of noise, and leaves or debris re-entering into the air duct 34 can be simultaneously and effectively solved. That is, because of the first inlet part 324, which is located above the central axis of the blower 100, being configured to face downwardly and extend rearwardly to enlarge the area of flow air, the flow air enters the air duct 34 from below and the noise can be effectively reduced due to the enlarged area of the flow air, and the second inlet part 325, which is located below the central axis of the blower 100, being configured to face upwardly and extend rearwardly, prevents the leaves or debris that are blown by the blower 100 from re-entering into the air duct 34 from below during the operation thereof.

In FIG. 7 and FIG. 8, the air duct assembly 30 defines a first projection plane 101 which is substantially perpendicular to a horizontal plane, a projection of the inlet section 322 in the first projection plane 100 defines as a first projection line 323, a highest point of the first projection line 323 away from the center axis of the blower is the farthest point away from the outlet section 312 in the first projection plane 101. Further, the first projection line 323 of the inlet section 322 is bent in a direction towards the outlet section 312 of the blower. A highest point of the first projection line away from the center axis of the blower is located at a same side of the central axis of the blower with the handle in the first projection plane.

The first projection line 323 includes a first projection line part 324 and a second projection line part 325, both of which tilt relative to the central axis line of the blower. In this embodiment of FIG. 3 to FIG. 4, the first projection line part 324 and/or the second projection line part 325 is a straight line, while in the other embodiments of FIG. 10 to FIG. 11, the first projection line part 324 and/or the second projection line part 325 may be an arc line 3241, 3251 or 3242, 3252, a tangent line 3241a, 3241b, 3251a, 3251b, 3242a, 3252a of which is inclined or tilts with respect the central axis 11 of the blower. In FIG. 3, the first projection line part 324 and the second projection line part 325 are combined to have a V-shaped pattern 3231, 3232 which has a bent point or part located more adjacent to the outlet 311 than any other points of the V-shaped pattern 3231, 3232.

Figure 9:
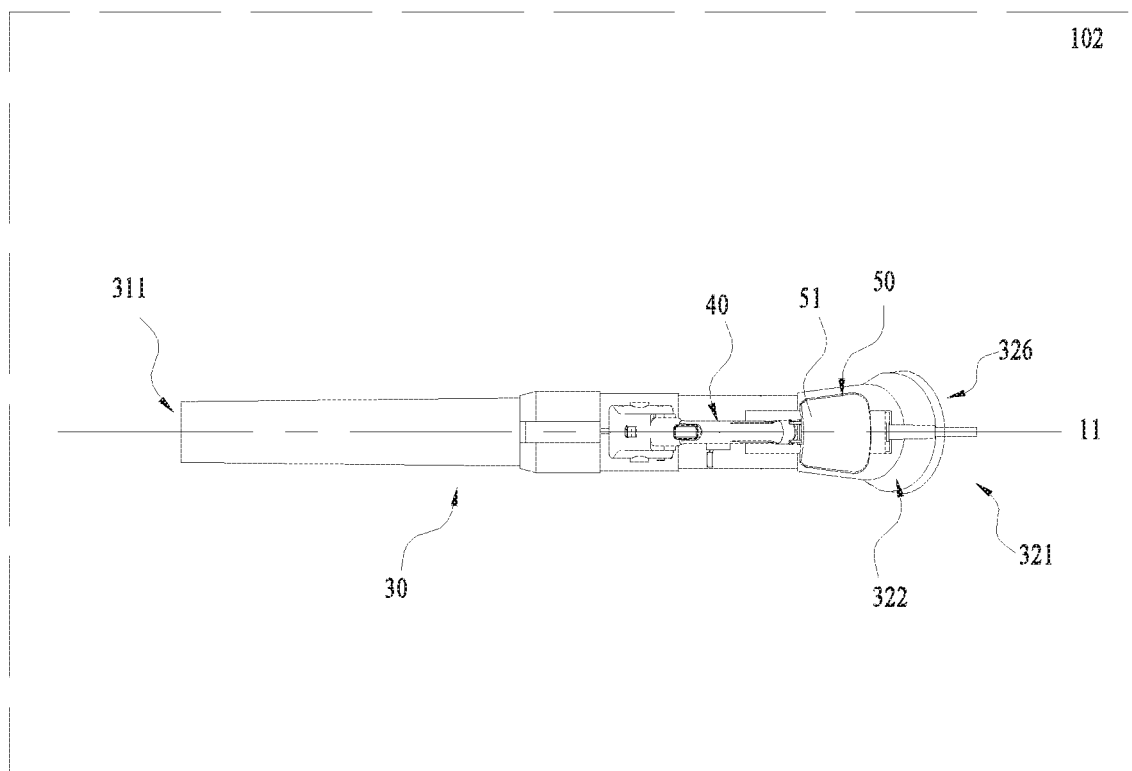
FIG. 9 is a schematic view showing a second projection line in a second projection plane of the blower of FIG. 1.

As shown in FIG. 7 and FIG. 9, the air duct assembly further defines a second horizontal projection plane perpendicular to a first projection plane, a projection of the inlet section 322 in the second projection plane defines as a second projection line 326, the second projection line 326 of the inlet section 322 is bent in a direction away from the outlet section 311 of the blower. In other words, the inlet section 322 of the air duct assembly is bent in a direction towards the outlet section 311 of the blower. Specifically, the inlet section 322 including the first inlet part 324 and the second inlet part 325 has a substantially middle portion, adjacent to the central axis of the blower, bent towards the outlet section 311 of the blower with the first inlet part 324 having the cover area greater than that of the second inlet part 325.

The first inlet part 324 of the inlet section 322 is configured to face downwardly and tilt relative to the central axis of the blower with a first tilting angle β, and the second inlet part 325 is configured to face upwardly and tilt relative to the central axis of the blower with a second tilting angle δ which is greater than the first tilting angle β, the first inlet part 324 having a cover area greater than that of the second inlet part 325. It should be noted that a sum of the first tilting angle and the second tilting angle is greater than 90 degrees, which is set to increase the amount of air into the blower from the outside.

Figure 10:
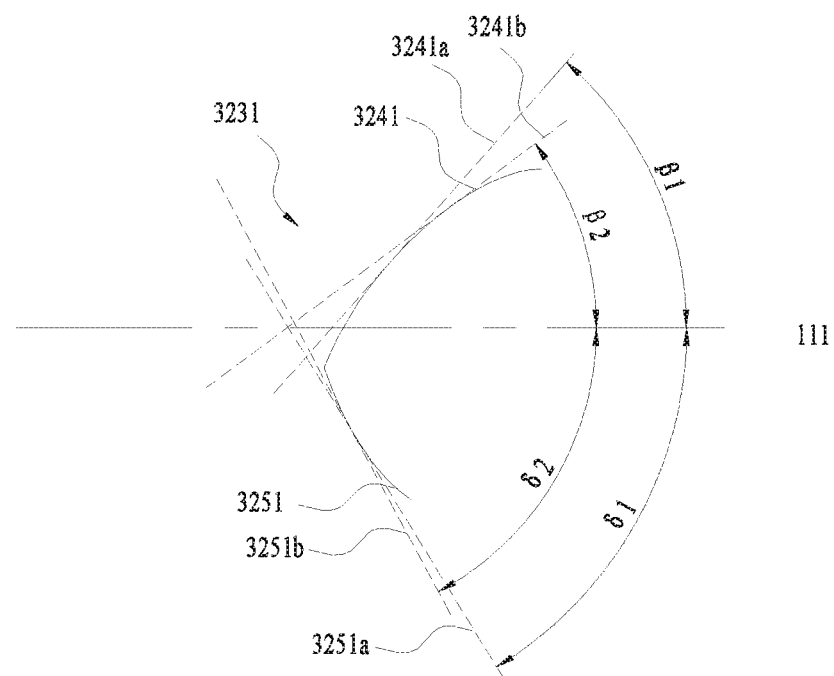
FIG. 10 is a schematic view of a further example of the first projection line in the first projection plane of the blower.

In another example illustrated in FIG. 10, a first tangent line 3241a of the first inlet part 324 tilts relative to the central axis of the blower with a first tilting angle β1, and a first tangent line 3251a of the second inlet part 325 tilts relative to the central axis of the blower with a second tilting angle δ1, a sum of the first tilting angle β1 and the second tilting angle δ1 is greater than 90 degrees, wherein each of the first tilting angle β1 or the second tilting angle δ1 is an acute angle.

A second tangent line 3241b of the first inlet part 324 tilts relative to the central axis of the blower with a first tilting angle β2, and a second tangent line 3251b of the second inlet part 325 tilts relative to the central axis of the blower with a second tilting angle δ2, a sum of the first tilting angle β2 and the second tilting angle δ2 is greater than 90 degrees with the first tilting angle β2 or the second tilting angle δ2 being an acute angle. The sum of the first tilting angle β1, β2 and the second tilting angle δ1, δ2 is greater than 90 degrees, which increases the amount of air into the blower from the outside, and simultaneously solves the problems of noise and leaves or debris re-entering into the air duct 34 by the first inlet part 324 and the second inlet part 325.

Figure 11:
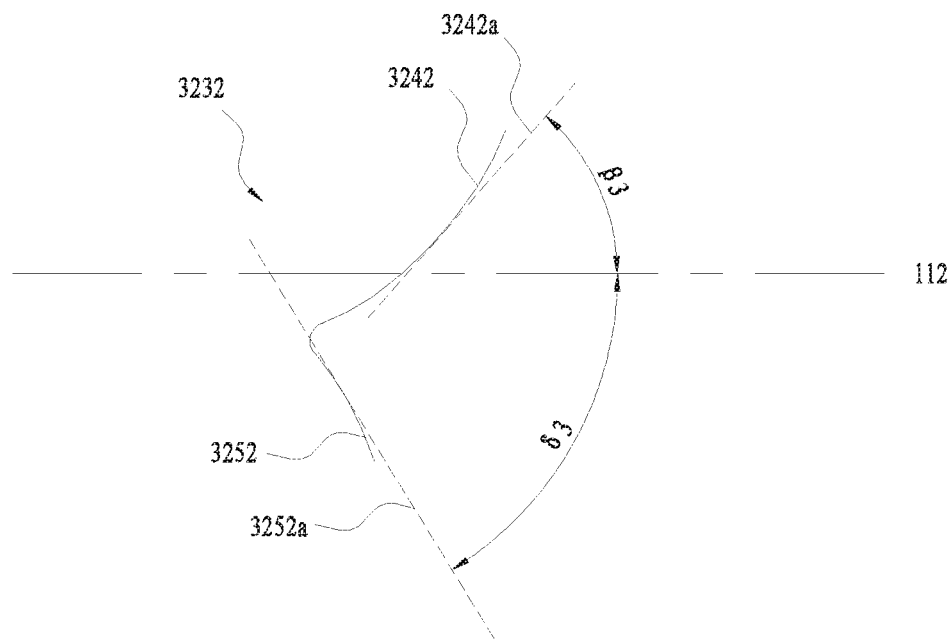
FIG. 11 is a schematic view of a still further example of the first projection line in the first projection plane of the blower.

In another example illustrated in FIG. 11, a third tangent line 3242a of the first inlet part 324 tilts relative to the central axis of the blower with a first tilting angle β3, and a third tangent line 3252a of the second inlet part 325 tilts relative to the central axis of the blower with a second tilting angle δ3, a sum of the first tilting angle β3 and the second tilting angle δ3 is greater than 90 degrees, and the first tilting angle β3 or the second tilting angle δ3 is an acute angle. Thus, the arrangement of the first inlet part 324 and the second inlet part 325 is to solve the problems of noise and leaves or debris re-entering into the air duct 34.

Figure 12:
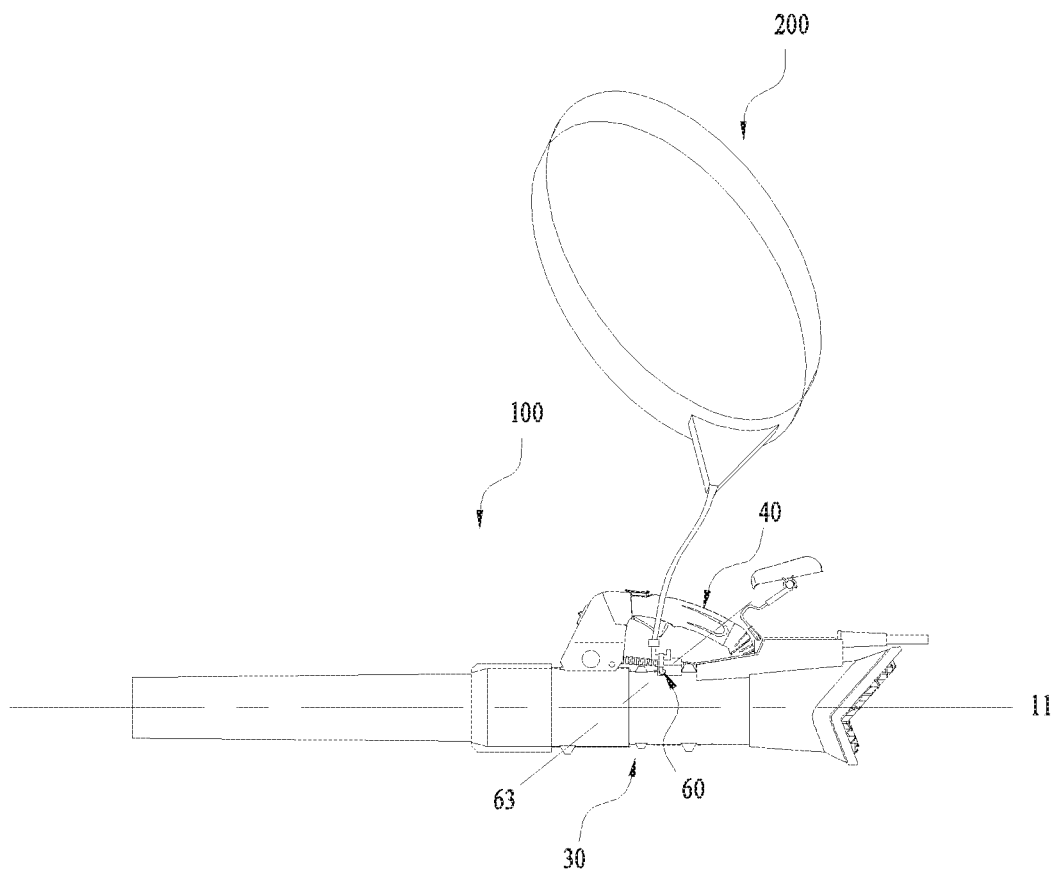
FIG. 12 is a schematic view of combination of the wearable equipment and the blower of FIG. 1.

As shown in FIG. 1 and FIG. 12, the wearable blower is provided with a hanger 60 disposed on the duct housing. The hanger 60 includes an attachment part 62 rotatably attached to the duct housing and adjacent to the handle 40, and a hanger part 61 connected to the attachment part 62 for holding an accessory attached to the blower. The hanger part 61 of the hanger 60 rotates with respect to the duct housing at a first hanging position whereat the hanger part 61 is unfolded with an opening mouth configured for holding the accessory of the blower, and the hanger part 61 of the hanger 60 rotates with respect to the duct housing at a second folded position whereat the hanger part 61 is folded with no easy ability to hold the accessory.

Figure 14:
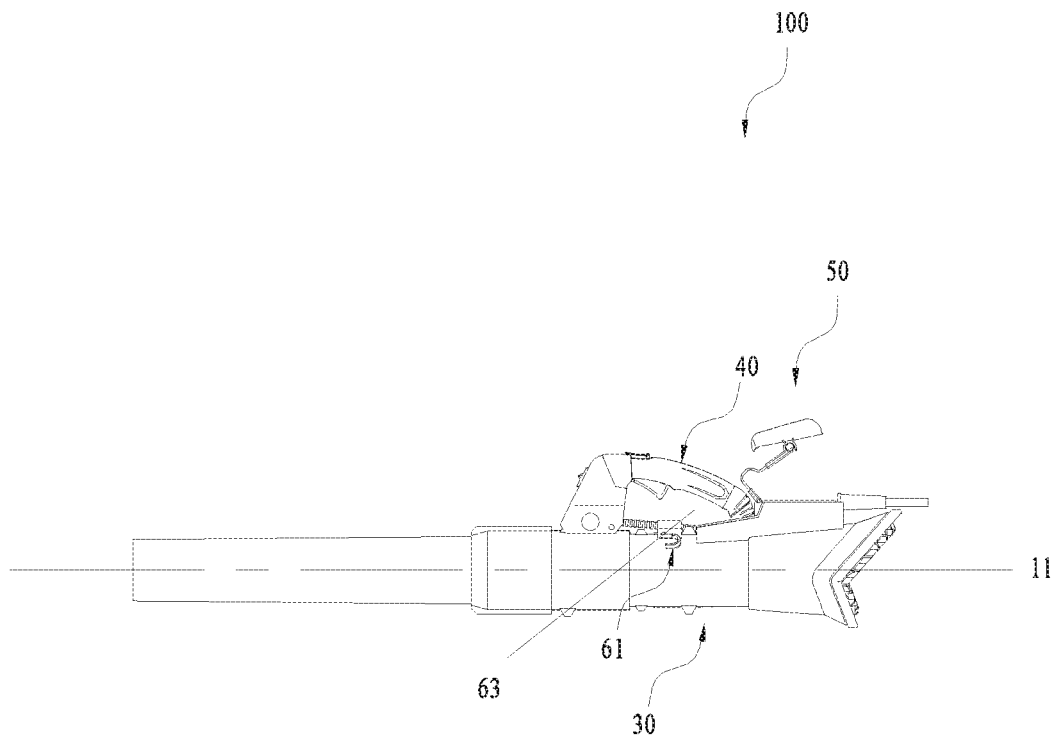
FIG. 14 is a schematic view of a hanger part rotatable about a rotation axis of the blower of FIG. 1.

In this embodiment of FIG. 14, the hanger 60 is located at a side of the duct housing adjacent to the handle 40 for the user to hold the blower. In other embodiments, the hangers 60 may be located at two opposite sides or different sides of the duct housing for the users to operate the blower by a right hand or a left hand for different operations.

Figure 13:
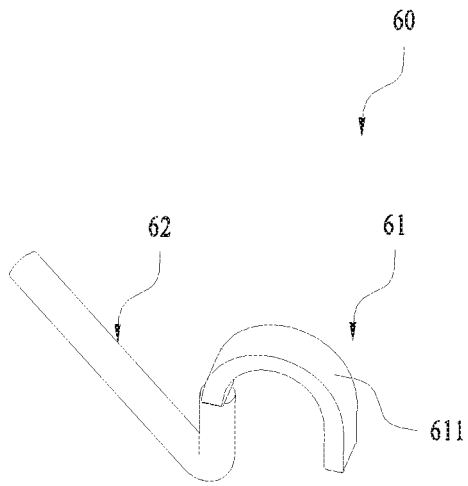
FIG. 13 is a schematic view of a hanger of the blower of FIG. 1.
Figure 15:
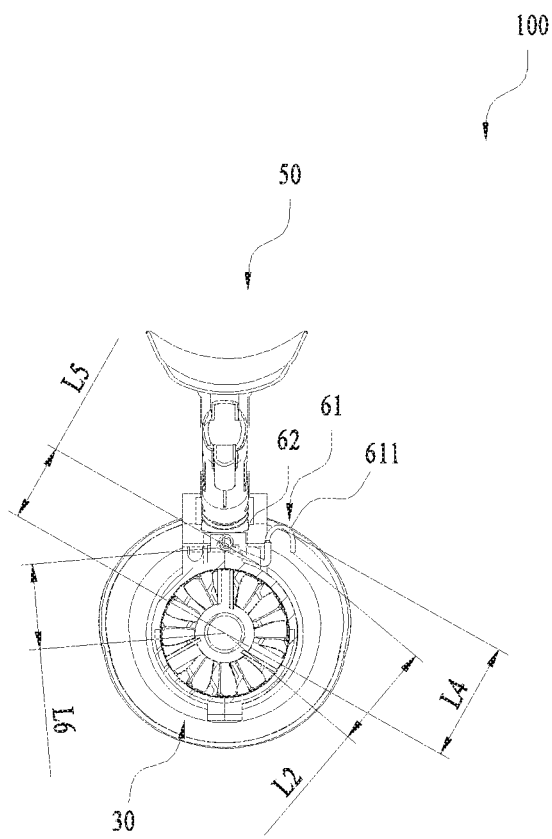
FIG. 15 is a schematic view of the blower showing an example of a hanger part located at a first hanging position.
Figure 16:
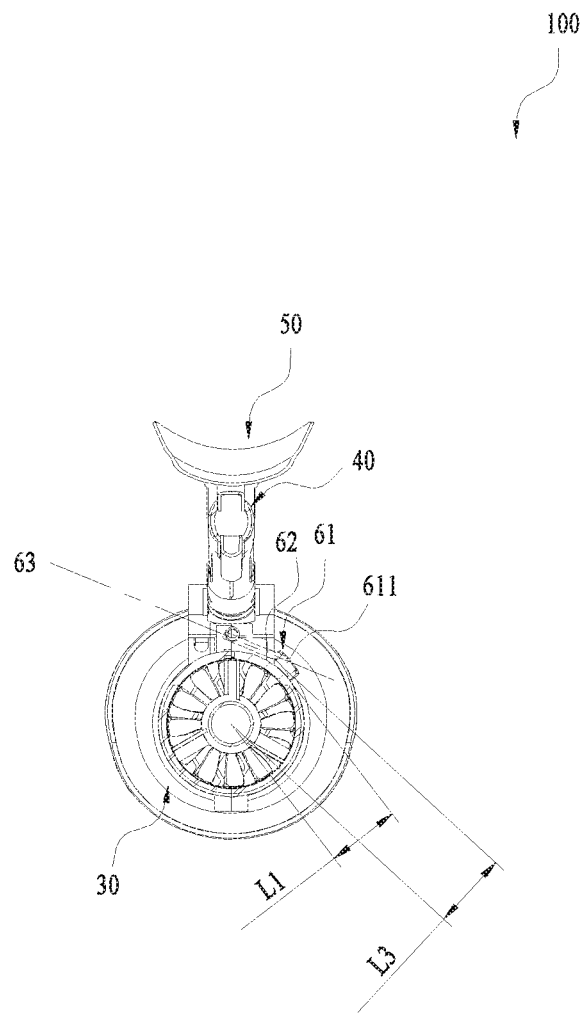
FIG. 16 is a schematic view of the blower showing the hanger part of FIG. 15 located at a second folded position.

Specifically, in FIG. 13, FIG. 15 and FIG. 16, a distance L1 of an end or a free end of the hanger part 61 to the central axis or line of the blower at the second folded position along the direction perpendicular to the central axis is less than a distance L2 of the end or free end of the hanger part 61 to the central axis of the blower at the first hanging position.

In this example, the hanger part 61 has an opened hook, the opened hook of the hanger 60 has a first suspension point away from a central line of the blower at the first hanging position and a second point away from a central line of the blower at the second folded position, a distance L3 of the second suspension point to the central line of the blower at the second folded position along the direction perpendicular to the central line is less than a distance L4 of the first point to the central line of the blower at the first hanging position.

In FIG. 4 and FIG. 14 to FIG. 16, the hanger part 61 is configured to rotate about a rotation axis 63, which tilts relative to the central axis or line 11 of the blower. That is, the rotation axis 63 of the hanger part 61 is not parallel to the central axis or line 11 of the blower, or not vertical to the horizontal plane of the blower.

In this example of FIG. 4 and FIG. 14, the handle 40 is attached to the duct housing with a first handle end and a second handle end, the hanger part 61 is located between the first handle end and the second handle end of the handle 40.

In other examples, an assembly of a hand-guided work apparatus or blower and a holder is disclosed with a holder 200 attached to the hand-guided work apparatus and configured to be worn by an operator. A hanger similar to that shown in FIG. 15 to FIG. 16 is disposed onto the duct housing and has an attachment part 62 rotatably attached to the duct housing and adjacent to the handle 40, and a hanger part 61 connected to the attachment part 62 for holding an accessory attached to the hand-guided work apparatus. The hanger part 61 is configured to rotate between a first hanging position and a second folded position about a rotation axis, which tilts relative to the central axis or line of the hand-guided work apparatus or blower.

Figure 17:
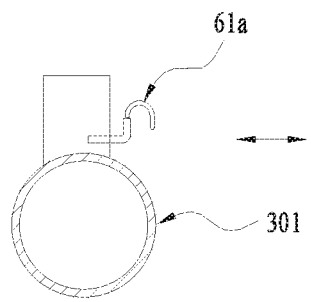
FIG. 17 is a schematic view showing a further example of a hanger part located at a first hanging position.
Figure 18:
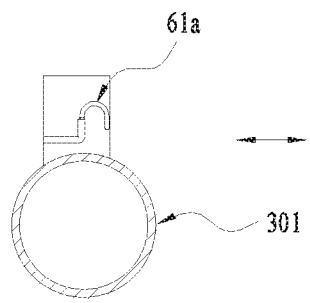
FIG. 18 is a schematic view showing the hanger part of FIG. 17 located at a second folded position.

In a second example of the hanger of FIG. 17 and FIG. 18, the hanger part 61a is slidably connected to the air duct 301 along the arrow direction. The first hanging position of the hanger part 61a is shown in FIG. 17, and the second folded position of the hanger part 61a is shown in FIG. 18.

Figure 19:
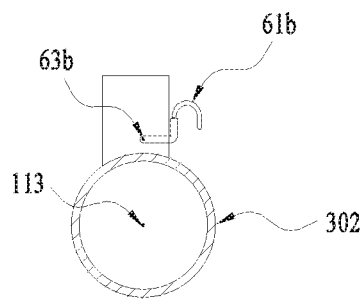
FIG. 19 is a schematic view showing a still further example of a hanger part located at a first hanging position.
Figure 20:
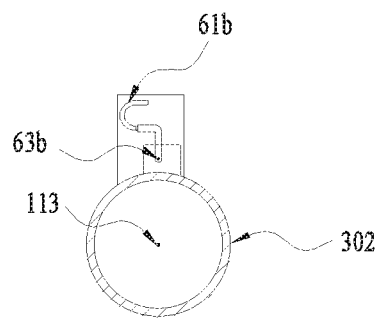
FIG. 20 is a schematic view showing the hanger part of FIG. 19 located at a second folded position.

In a third example of the hanger of FIG. 19 and FIG. 20, the hanger part 61b is coupled to the air duct 302, and rotates with the air duct 302 about a rotation axis 63b, which is substantially parallel to the central axis of the air duct 302. FIG. 19 shows a first hanging or work position of the hanger part 61b, and FIG. 20 shows a second folded or work position of the hanger part 61b. Note that the hanger can provide at least two work positions varying in accordance with the user's different operating states in other examples of the present invention. For example, the hanger can rotate to a predetermined work position along with the rotation of the blower when the user laterally holds the blower to work.

Figure 21:
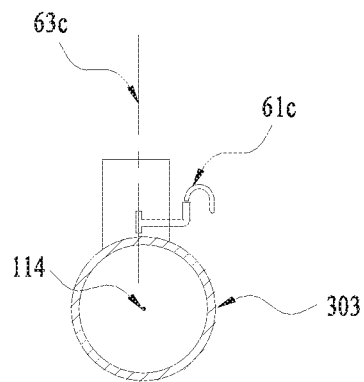
FIG. 21 is a schematic view showing a yet further example of a hanger part located at a first hanging position.
Figure 22:
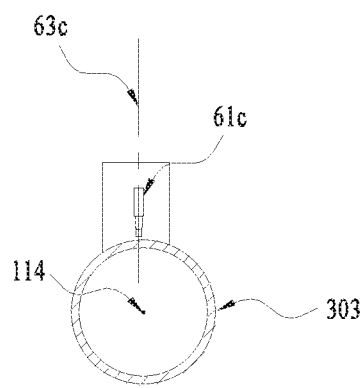
FIG. 22 is a schematic view showing the hanger part of FIG. 21 located at a second folded position.

In a fourth example of the hanger of FIG. 21 and FIG. 22, the hanger part 61c is movably coupled to the air duct 303, and rotates with the air duct 302 about a rotation axis 63c which is substantially perpendicular to the central axis 114 and through the air duct 303, or a horizontal plane of the blower. The first hanging position of the hanger part 61c is shown in FIG. 21, and the second folded position of the hanger part 61c is shown in FIG. 22.

Figure 23:
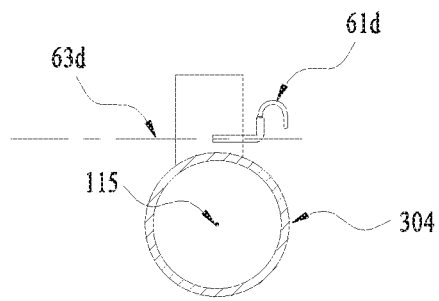
FIG. 23 is a schematic view showing a still further example of a hanger part located at a first hanging position.
Figure 24:
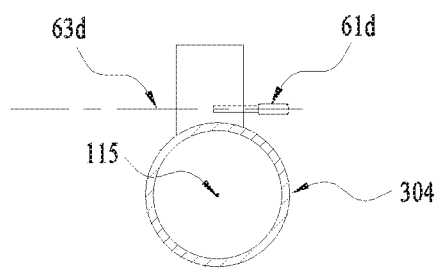
FIG. 24 is a schematic view showing the hanger part of FIG. 23 located at a second folded position.

In a fifth example of the hanger of FIG. 23 and FIG. 24, the hanger part 61d is coupled to the air duct 304, and rotate about another rotation axis 63d substantially perpendicular to the central axis 115 and not through the air duct 304. FIG. 23 shows a first hanging or work position of the hanger part 61d, and FIG. 24 shows a second folded or work position of the hanger part 61d. Note that the hanger can provide a plurality of work positions including at least two work positions that vary in accordance with the user's different operating states as shown in other examples described herein. For example, the hanger can rotates to a predetermined work position along with the rotation of the blower when the user laterally holds the blower to work.

It should be appreciated that the hanger part can rotate with respect to the duct housing between a plurality of work positions at least including a first work position and a second work position wherein the work positions of the hanger part vary in accordance with the user's different operating states.

As above, the hanger part 61, 61a, 61b, 61c, 61d may be configured as a ring-like structure which is coupled to a connecting hook of the wearable accessory 200. The hanger part 61, 61a, 61b, 61c, 61d may be made of a magnetic material or a metallic material and can be actively attracted to or passively attracted to the wearable device 200 by the magnetic or metallic hanger part 61, 61a, 61b, 61c, 61d.

Figure 25:
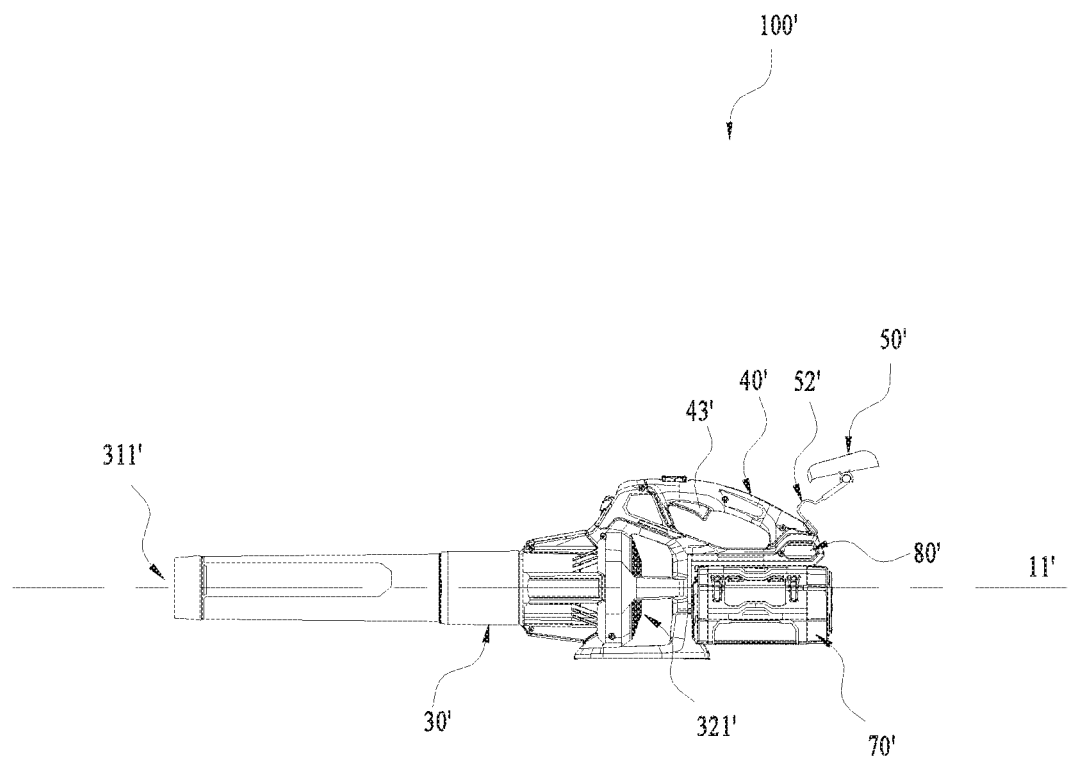
FIG. 25 is a schematic view of another exemplary blower with an arm support.
Figure 26:
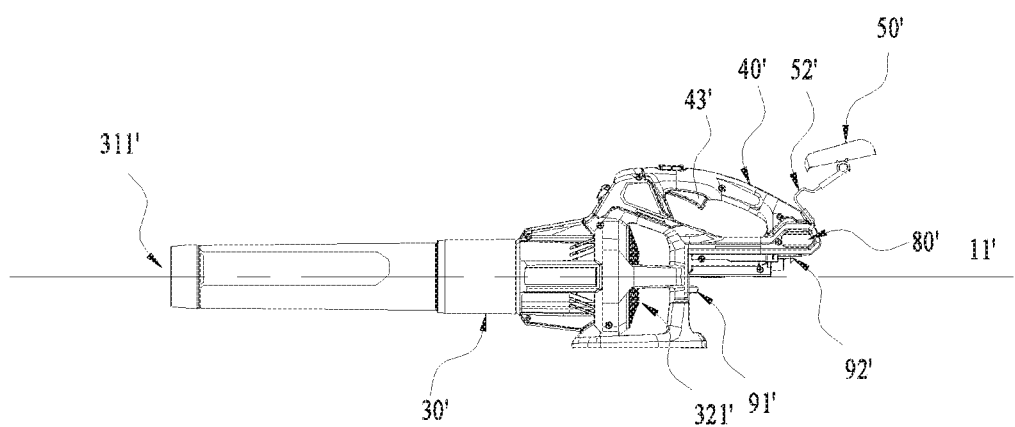
FIG. 26 is a schematic view of the blower of FIG. 25 with at least one battery pack removed therefrom.
Figure 27:
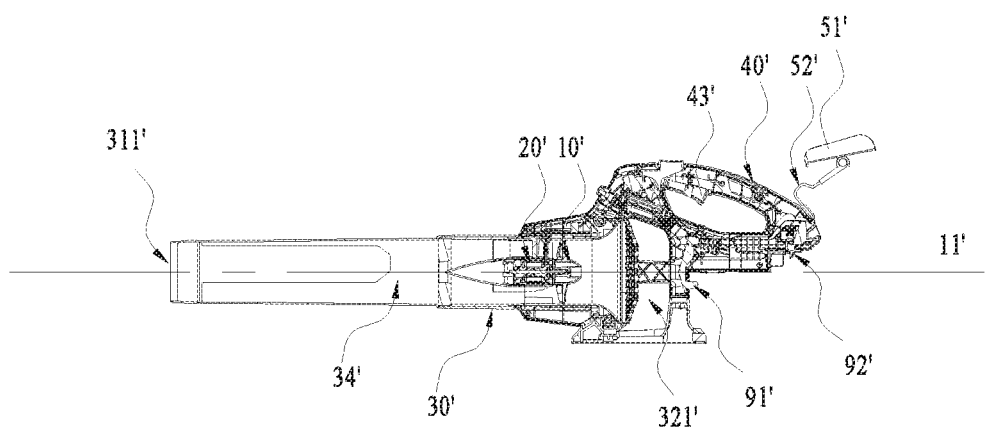
FIG. 27 is a cross-sectional view showing the structure of the blower of FIG. 26.

As shown in FIG. 25 to FIG. 27, a blower assembly 100' of another example is similar to the above blower, and includes a fan 10', a motor 20', a handle 40', an air duct 30', an arm support 50' with a support surface 51', at least one battery pack 70' and a blower housing defining a battery receptacle 80' with a battery interface for securely holding the at least one battery pack 70' onto the blower. The at least one battery pack 70' is attached to the blower for powering the motor 20'. The air duct 30' forms an air duct passage 34' with an air inlet 321' and an air outlet 311'. In this example, the handle 40' is located between the air inlet 321' and the battery pack 70' along the central axis direction of the blower. The at least one battery pack is disposed under the handle 40' such that a center of gravity of the battery pack is located at a region between the handle ends of the handle 40' or a center of gravity of the at least one battery pack is located between the air inlet 321' and the arm support 50'.

The blower 100' includes a holder assembly set for holding the at least one battery pack onto the blower. The holder assembly includes an ejection mechanism 91' for enabling the battery pack 70' to be ejected from the housing 80', and a locking member 92' for locking the battery pack 70' onto the blower housing. In this embodiment, the battery pack outputs the voltage of 56V, which has a greater output power than that used before.

In this example of FIG. 25 to FIG. 27, the battery interface 80' has a front side and a rear end along the central axis direction of the blower. The front side of the battery interface 80' is disposed at a location exceeding or beyond a one-half length of the handle along the central axis direction so that the blower provides a greater interface for holding the at least one battery pack, which has a greater volume and/or output of power with voltage of 56V.

The above illustrates and describes basic principles, main features and advantages of the invention hereinafter claimed. Those skilled in the art should appreciate that the above embodiments do not limit the invention hereinafter claimed in any form. Technical solutions obtained by equivalent substitution or equivalent variations all fall within the scope of the invention hereinafter claimed.

What is claimed is:

1. A blower, comprising: a fan rotatable about a central axis; a drive unit configured to drive the fan; an air duct having a duct housing for accommodating at least one of the fan and the drive unit therein; a handle attached to the duct housing; and a hanger disposed on the duct housing, the hanger having an attachment part rotatably attached to the duct housing and adjacent to the handle, and a hanger part connected to the attachment part for holding an accessory attached to the blower, wherein the hanger part rotates with respect to the duct housing at a first hanging position whereat the hanger part is unfolded with an opening mouth configured for holding the accessory to the blower, and the hanger part rotates with respect to the duct housing at a second folded position whereat the hanger part is folded, and wherein the duct housing comprises an air inlet at a first end of the duct housing and an air outlet at a second end of the duct housing, wherein the first end and the second end are opposite ends of the duct housing, the handle is symmetric about a first plane that extends through and is parallel to the central axis, where the air inlet includes a first inclined part and a second inclined part, wherein the first inclined part is inclined downwardly from a topmost end of second end towards a meeting point near the central axis, the second inclined part is inclined upwardly from a bottommost end of the second end towards the meeting point, wherein the meeting point is where the first inclined part and the second inclined part meet, and wherein the meeting point is closer to the fan than the topmost end and the bottommost part of the second end.

2. The blower of claim 1, wherein a distance L1 of an end of the hanger part to a central line of the blower at the second folded position along a direction perpendicular to the central line is less than a distance L2 of the end of the hanger part to the central line of the blower at the first hanging position.

3. The blower of claim 1, wherein the hanger part includes an opened hook, the opened hook of the hanger has a first suspension point away from a central line of the blower at the first hanging position and a second suspension point away from the central line of the blower at the second folded position, a distance L3 of the second suspension point to the central line of the blower at the second folded position along a direction perpendicular to the central line is less than a distance L4 of the first suspension point to the central line of the blower at the first hanging position.

4. The blower of claim 1, wherein the hanger part includes an opened hook, a distance L1 of the hanger part to a central line of the blower at the second folded position along a direction perpendicular to the central line is less than a distance L2 of the hanger part to the central line of the blower at the first hanging position.

5. The blower of claim 1, wherein the hanger part is configured to rotate about a rotation axis, which tilts relative to a central line of the blower.

6. The blower of claim 1, wherein the handle is attached to the duct housing with a first handle end and a second handle end, the hanger part is located between the first handle end and the second handle end of the handle.

7. An assembly, comprising: a hand-guided work apparatus; and a holder attached to the hand-guided work apparatus and configured to be worn by an operator; the hand-guided work apparatus comprising: a fan; a drive unit configured to drive the fan; an air duct having a duct housing for accommodating at least one of the fan and the drive unit therein; a handle attached to the duct housing; and a hanger disposed on the duct housing, the hanger having an attachment part rotatably attached to the duct housing and adjacent to the handle, and a hanger part connected to the attachment part for holding an accessory attached to the hand-guided work apparatus, wherein the hanger part is configured to rotate between a first, hanging position and a second, folded position about a rotation axis, which tilts relative to a central axis of the hand-guided work apparatus, and wherein the duct housing includes an air passage extending along a central axis, the air passage is provided with an air inlet and an air outlet, the handle is symmetric about a first plane that extends through and is parallel to the central axis, wherein the air inlet comprises a first inlet part above the central axis and a second inlet part below the central axis that intersect each other at an intersection point near the central axis, wherein the first inlet part faces downwardly and the second inlet part is faces upwardly, and wherein the angle between the first inlet part and the second inlet part is greater than 90 degrees.

8. The blower of claim 1, wherein a line passing through the topmost end of the second end and the meeting point is defined as a first straight line, a second line passing through the bottommost end of the second end and the meeting point is defined as a second straight line, the first straight line is obliquely intersecting the second straight line.

9. The blower of claim 8, wherein an angle formed by the intersection of the first straight line and the straight second line is greater than 90 degrees.

10. The blower of claim 1, wherein the first and second inclined parts form a V-shape in the first plane.

11. The blower of claim 1, wherein the handle is disposed on the upper side of the duct housing, and the meeting point is disposed on the lower side of the central axis.

12. The blower of claim 1, further comprising: an isolation cover covering the air inlet, wherein a first and second inclined part of the isolation cover are respectively parallel to the first and second inclined part of the second end in the first plane and form a V-shape in the first plane.

* * * * *